United States Patent
Kim et al.

(10) Patent No.: US 9,200,151 B2
(45) Date of Patent: Dec. 1, 2015

(54) POLYPROPYLENE RESIN COMPOSITION

(71) Applicants: Hyundai Motor Company, Seoul (KR); Kia Motors Corporation, Seoul (KR); Han Il E Hwa Co., Ltd., Seoul (KR)

(72) Inventors: Hak Soo Kim, Seoul (KR); Dae Sik Kim, Gyeonggi-Do (KR); Im Taek Sung, Incheon (KR); Hyeong Geun Oh, Chungcheongnam-Do (KR); Won Gil Kim, Chungcheongnam-Do (KR); Byung Uk Kang, Daejeon (KR)

(73) Assignees: Hyundai Motor Company, Seoul (KR); Kia Motors Corporation, Seoul (KR); HAN IL E HWA CO., LTD., Seoul (KR)

( * ) Notice: Subject to any disclaimer, the term of this patent is extended or adjusted under 35 U.S.C. 154(b) by 0 days.

(21) Appl. No.: 14/556,171

(22) Filed: Nov. 30, 2014

(65) Prior Publication Data

US 2015/0175790 A1  Jun. 25, 2015

(30) Foreign Application Priority Data

Dec. 20, 2013 (KR) .......................... 10-2013-0159821

(51) Int. Cl.
*C08L 23/12* (2006.01)

(52) U.S. Cl.
CPC ........... *C08L 23/12* (2013.01); *C08L 2205/025* (2013.01); *C08L 2205/03* (2013.01); *C08L 2205/035* (2013.01)

(58) Field of Classification Search
CPC .............. C08L 23/12; C08L 2205/025; C08L 2205/03; C08L 2205/035

See application file for complete search history.

(56) References Cited

FOREIGN PATENT DOCUMENTS

| JP | 1991-250040 | | 11/1991 | |
|---|---|---|---|---|
| JP | 2007-031606 | A | 2/2007 | |
| JP | 2008-163120 | A | 7/2008 | |
| JP | 2013-116981 | A | 6/2013 | |
| KR | 10-2002-0050460 | | 6/2002 | |
| KR | R10-2002005046 | * | 6/2002 | ............. C08L 23/10 |
| KR | 10-2005-0099107 | | 10/2005 | |
| KR | 10-2008-0069364 | | 7/2008 | |
| KR | 10-2010-0027322 | | 3/2010 | |
| KR | 10-2010-0027922 | | 3/2010 | |

(Continued)

*Primary Examiner* — Robert Harlan
(74) *Attorney, Agent, or Firm* — Mintz Levin Cohn Ferris Glovsky and Popeo, P.C.; Peter F. Corless

(57) ABSTRACT

The present invention provides a polypropylene resin composition including (A) about 60 to 80% by weight of a base resin selected from the group consisting of a high crystalline polypropylene, a propylene-ethylene copolymer, and a mixture thereof; (B) about 2 to 8% by weight of a styrene-ethylene/butene-styrene elastomer; (C) about 6 to 10% by weight of an ethylene-octene elastomer; (D) about 5 to 10% by weight of whisker; (E) about 2 to 8% by weight of talc; (F) about 1 to 3% by weight of a modified polypropylene grafted with maleic anhydride; (G) about 1 to 5% by weight of a vinyl-based acetal compatibilizer; and (H) about 1 to 3% by weight of a slipping agent containing a siloxane-based compound and an amide-based compound, with respect to the total weight of polypropylene. Polypropylene resin compositions according to the present invention can exhibit excellent physical properties such as high stiffness and impact resistance even though formed into a thin film. Hence, the polypropylene resin composition of the present invention can be effectively applied as a vehicle interior material such as a door trim, a pillar trim, a tail gate, and further can contribute to reducing weight of a vehicle.

15 Claims, 1 Drawing Sheet

(56) References Cited

FOREIGN PATENT DOCUMENTS

| KR | R10-2010002732 | * | 3/2010 | ............ | C08L 23/12 |
| KR | 10-2010-0051496 | | 5/2010 | | |
| KR | 10-2012-0118274 | | 10/2012 | | |
| KR | 10-2013-0017837 | | 2/2013 | | |
| KR | R10-2013001783 | * | 2/2013 | ............ | C08L 23/10 |
| KR | 10-2013-0053648 | | 5/2013 | | |
| KR | 10-2013-0135519 A | | 12/2013 | | |

* cited by examiner

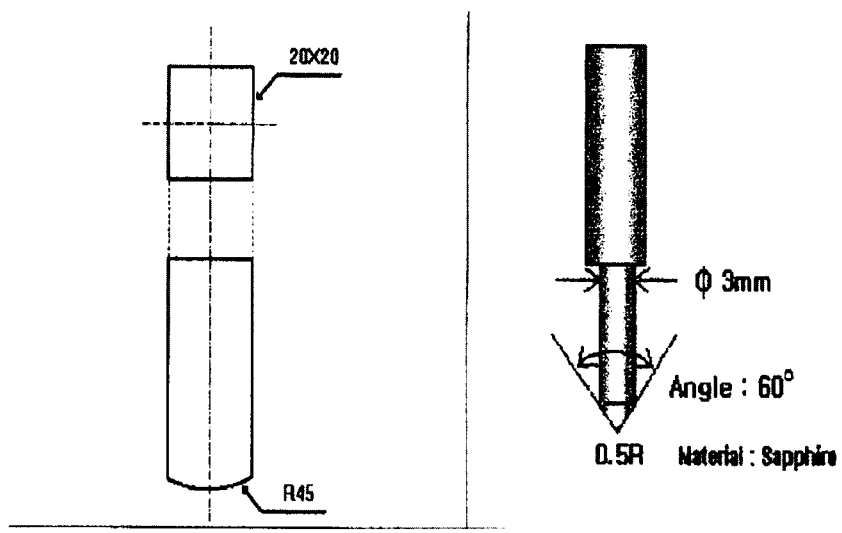

POLYPROPYLENE RESIN COMPOSITION

CROSS-REFERENCE TO RELATED APPLICATION

This application claims under 35 U.S.C. §119(a) the benefit of Korean Patent Application No. 10-2013-0159821 filed Dec. 20, 2013, the entire contents of which are incorporated herein by reference.

TECHNICAL FIELD

The present disclosure relates to a polypropylene resin composition. In particular, the present disclosure relates to a polypropylene resin composition for a vehicle interior material. The polypropylene resin composition may include a predetermined amount of impact property reinforcing materials of rubbery component such as a styrene-ethylene/butene-styrene elastomer and an ethylene-octene elastomer; inorganic fillers such as whisker and talc; a modified polypropylene; a vinyl-based acetal compatibilizer; and a slipping agent in a base resin selected from the group consisting of a high crystalline polypropylene, a propylene-ethylene copolymer, and a mixture thereof. Due to the polypropylene resin composition according to the present invention, a thinner molding is possible although the thickness of product is as thin as 2 mm, and the decrease in stiffness and impact resistance associated with the structurally thinned molding is improved.

BACKGROUND

Recently, improving fuel efficiency has been one of the major issues in the vehicle industry. Because depletion of natural resources is expected, such improvement in fuel efficiency can be one of the best ways for energy conservation. Hence, efforts on reduction in vehicle weight have been extensively made to improve fuel efficiency.

Particularly, decreasing thickness of product made of plastics among vehicle parts has been suggested for reducing vehicle weight. However, decreased thickness of product may cause deterioration in moldability at the time of injection molding and deterioration in physical properties, such as stiffness and impact strength, as the thickness of such plastic products is reduced to be a thin film.

Meanwhile, a certain polypropylene resin composition having excellent stiffness and high impact property has been reported previously. The impact property may be secured by adding a rubber component excellent in impact improvement effect to a high crystalline homopolypropylene excellent in stiffness, and further the stiffness may be reinforced by adding an inorganic filler. This polypropylene resin composition, however, may not satisfy the stiffness and impact resistance required for a vehicle interior part and the thickness of the part may be reduced. See Korean Patent Application Publication No. 2010-0027922.

Hence, because a polypropylene resin composition is utilized for a vehicle interior material, development for such a polypropylene resin composition, of which the excellent physical properties such as high stiffness and high impact property are preserved while the moldability is improved even though the thickness of product is thinned or to be thin film and which is further suitable for a vehicle interior material, is strongly desired.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described technical problems. Excellent physical properties such as high fluidity, high stiffness, and high impact property can be obtained when impact property reinforcing materials of rubbery component such as a styrene-ethylene/butene-styrene elastomer and an ethylene-octene elastomer; inorganic fillers such as whisker and talc; a modified polypropylene; a slipping agent; and a vinyl-based acetal compatibilizer are mixed in an appropriate amount to a base resin selected from the group consisting of a high crystalline polypropylene, a propylene-ethylene copolymer, and a mixture thereof.

Therefore, the present invention provides a polypropylene resin composition having excellent moldability due to high fluidity, and excellent mechanical properties such as high stiffness and high impact property.

Furthermore, the present invention provides a vehicle interior material manufactured using the polypropylene resin composition thereof.

In one aspect, the present invention provides a polypropylene resin composition including (A) about 60 to 80% by weight of a base resin based on total weight of the polypropylene resin composition, the base resin selected from the group consisting of a high crystalline polypropylene, a propylene-ethylene copolymer, and a mixture thereof; (B) about 2 to 8% by weight of a styrene-ethylene/butene-styrene elastomer based on total weight of the polypropylene resin composition; (C) about 6 to 10% by weight of an ethylene-octene elastomer based on total weight of the polypropylene resin composition; (D) about 5 to 10% by weight of whisker based on total weight of the polypropylene resin composition; (E) about 2 to 8% by weight of talc based on total weight of the polypropylene resin composition; (F) about 1 to 3% by weight of a modified polypropylene grafted with maleic anhydride based on total weight of the polypropylene resin composition; (G) about 1 to 5% by weight of a vinyl-based acetal compatibilizer based on total weight of the polypropylene resin composition; and (H) about 1 to 3% by weight of a slipping agent containing a siloxane-based compound and an amide-based compound based on total weight of the polypropylene resin composition.

In another aspect, the present invention provides a vehicle interior material manufactured using the polypropylene resin composition thereof.

In one exemplary embodiment of the present invention, the polypropylene resin composition exhibits excellent moldability due to high fluidity and excellent physical properties such as high stiffness and high impact property, therefore can be effectively applied, without limitation, to a door trim, a pillar trim, and a tail gate of a vehicle.

In another exemplary embodiment according to the present invention, the polypropylene resin composition is possible to be molded until the thickness of product is reduced to the level of 2 mm, and the decrease in stiffness and impact resistance associated with the structurally thinned thickness is improved, and thus vehicle weight can be reduced. Therefore, the polypropylene resin composition of the present invention can contribute to improvement in fuel efficiency.

BRIEF DESCRIPTION OF DRAWING

FIG. 1 illustrates an exemplary scratch tester with sapphire tip to measure scratch resistance according to an exemplary embodiment of the present invention.

DETAILED DESCRIPTION

Hereinafter reference will now be made in detail to various embodiments of the present invention, examples of which are described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention provides a polypropylene resin composition including (A) about 60 to 80% by weight of a base resin selected from the group consisting of a high crystalline polypropylene, a propylene-ethylene copolymer, and a mixture thereof; (B) about 2 to 8% by weight of a styrene-ethylene/butene-styrene elastomer; (C) about 6 to 10% by weight of an ethylene-octene elastomer; (D) about 5 to 10% by weight of whisker; (E) about 2 to 8% by weight of talc; (F) about 1 to 3% by weight of a modified polypropylene grafted with maleic anhydride; (G) about 1 to 5% by weight of a vinyl-based acetal compatibilizer; and (H) about 1 to 3% by weight of a slipping agent containing a siloxane-based compound and an amide-based compound, with each of the above weight percents based on the total weight of the polypropylene resin composition.

The base resin is a primary material of the polypropylene resin composition for vehicle interior material, may be selected from the group consisting of a high crystalline polypropylene, a propylene-ethylene copolymer, and a mixture thereof, and is preferably contained at about 60 to 80% by weight with respect to the total weight of polypropylene resin composition.

In preferred aspect, a high crystalline polypropylene may have an isotactic index (when measured by $^{13}$C-NMR) of 97% or more, and a high crystalline polypropylene may have a melt flow index of about 10 to 60 g per 10 min (230° C., 2.16 kg). When the melt flow index of high crystalline polypropylene is less than 10 g per 10 min, the moldability is not desirable; and when the melt flow index of high crystalline polypropylene is more than 60 g per 10 min, the mechanical strength, such as impact strength and stiffness, of polypropylene resin deteriorates, and thus there is limitation in use as a base material of vehicle interior material.

Moreover, the propylene-ethylene copolymer may have an ethylene monomer content of about 2 to 25% by weight based on propylene-ethylene copolymer weight. Toughness deteriorates when the ethylene monomer content is less than 2% by weight based on propylene-ethylene copolymer weight, and stiffness deteriorates when the ethylene monomer content is more than 25% by weight based on propylene-ethylene copolymer weight. Thus, the propylene-ethylene copolymer may not be used as a base material for vehicle interior material. Hence, the propylene-ethylene copolymer may preferably contain an ethylene monomer in the above described range.

In another preferred aspect, the base resin according to the present invention may be contained at about 60 to 80% by weight with respect to the total weight of the polypropylene resin composition. Since impact resistance and stiffness deteriorates when the base resin content is less than 60% by weight or more than 80% by weight, there may be a limitation in use as a base material for vehicle interior materials. Hence, the base resin is preferably used in the above described range.

Next, the styrene-ethylene/butene-styrene elastomer (SEBS) may be an impact property reinforcing material of rubbery component complementing the impact strength of polypropylene resin, and is preferably used at about 2 to 8% by weight with respect to the total weight of the polypropylene resin composition. Impact resistance deteriorates when the styrene-ethylene/butene-styrene elastomer is less than 2% by weight, and stiffness and scratch resistance deteriorate when the styrene-ethylene/butene-styrene elastomer is more than 8% by weight. Hence the styrene-ethylene/butene-styrene elastomer is preferably used in the above described range.

The ethylene-octene elastomer (EOR) may be an impact property reinforcing material of rubbery component complementing the impact strength of polypropylene resin, likewise the styrene-ethylene/butene-styrene elastomer, and may be contained at about 6 to 10% by weight with respect to the total weight of the polypropylene resin composition. The dimension stability and the impact property are unstable when ethylene-octene elastomer is less than 6% by weight, and stiffness and scratch resistance deteriorate when the ethylene-octene elastomer is more than 10% by weight. Hence, the ethylene-octene elastomer is preferably used in the above described range.

The whisker may have an acicular shape and may be selected from the group consisting of a magnesium-based whisker, a titanate-based whisker, and a calcium carbonate-based whisker. The whisker can be used together with about 0.2 to 1.0% by weight of magnesium stearate. In addition, the whisker may be an inorganic filler having an average length of about 10 to 20 μm and an average diameter of about 1.0 μm or less, more preferably an average diameter of about 0.5 μm, and may perform a role reinforcing stiffness and impact resistance. Stiffness deteriorates when the average length of the whisker is less than 10 μm; the surface characteristics deteriorate due to exposure of the exterior appearance; and the deviation of shrinkage rate in the vertical direction to the flow direction increases when the average length is more than 20 μm. Hence, a whisker in the above described range is preferably used. Moreover, the stiffness reinforcement effect is reduced as the aspect ratio decreases when the average diameter of whisker is more than 1.0 μm, and thus a whisker having an average diameter of 0.5 μm is preferably used.

In addition, the whisker in the present invention may be used at about 5 to 10% by weight with respect to the total weight of the polypropylene resin composition. Impact strength, stiffness, and impact resistance decrease when the whisker is less than 5% by weight; and the weight of product increases and the surface of interior material is unstable due to increase in specific gravity when the whisker is more than 10% by weight. Hence, the whisker is preferably used in the above described range.

The talc may have a platy shape, and the talc having an average particle size of about 10 μm or less may be used, since mechanical properties such as stiffness and toughness deteriorate when the average particle size of talc is more than 10 μm.

In addition, the talc in the present invention is preferably used at about 2 to 8% by weight with respect to the total weight of the polypropylene resin composition. Stiffness and dimension stability are reduced when the talc is less than 2% by weight; and the weight of product increases and scratch resistance deteriorates due to increase in specific gravity when the talc is more than 8% by weight. Hence, the talc is preferably used in the above described range.

Furthermore, an inorganic filler obtained by mixing the whisker and talc together can be used in the present invention. The whisker and the talc may be contained at about 50 to 80% by weight and about 20 to 50% by weight with respect to the total weight of the inorganic filler, respectively.

The modified polypropylene used in the present invention may be a polypropylene grafted with maleic anhydride. The modified polypropylene may improve the compatibility and bondability between the polypropylene resin compositions and may increase the mutual affinity of the polypropylene resin composition, therefore the physical properties of the polypropylene resin composition can be improved. In particular, the bondability of polypropylene with an inorganic filler and a stabilizer is increased by bonding of homopolypropylene with maleic anhydride and a peroxide, and action of an amine-based polar group.

In addition, the modified polypropylene grafted with a polar group of the polypropylene resin may be used at about 1 to 2% by mole, and may be contained at about 1 to 3% by weight with respect to the total weight of the polypropylene resin composition. Physical properties cannot be improved since the bondability between the polypropylene resin compositions deteriorates when the modified polypropylene is less than 1% by weight, and deterioration in the physical properties of PP composite due to overuse may occur when the modified polypropylene is more than 3% by weight. Hence, the modified polypropylene is preferably used in the above described range.

Moreover, the polypropylene resin composition of the present invention can further include a vinyl-based acetal compatibilizer in addition to the modified polypropylene.

The vinyl-based acetal compatibilizer can be one or more selected from the group consisting of a high molecular compound obtained by polymerization of a vinyl-based acetal monomer, a high molecular compound containing a vinyl-based acetal or a derivative thereof in a monomer, and a copolymer thereof.

In addition, the vinyl-based acetal compatibilizer may be used at about 1 to 5% by weight with respect to the total weight of the polypropylene resin composition. Physical properties may not be secured due to deterioration in bondability when the vinyl-based acetal compatibilizer is less than 1% by weight; and deterioration in physical properties due to over use occurs when the vinyl-base acetal compatibilizer is more than 5% by weight. Hence, the vinyl-based acetal compatibilizer is preferably used in the above described range.

The slipping agent used in the present invention may contain a siloxane-based compound and an amide-based compound, thereby improving scratch resistance. The slipping agent may contain a siloxane-based compound and an amide-base compound at a mixing ratio of between 1:9 and 9:1. Scratch resistance may not be secured when the mixing ratio is out of a range of between 1:9 and 9:1. Thus, a siloxane-based compound and an amide-base compound are preferably mixed together in the above described range.

In one exemplary embodiment, as of the siloxane-based compound, polydimethylsiloxane having a molecular weight of about 200,000 or more can be used. The siloxane-based compound may be used to impart slipping property to the surface of a vehicle interior material, and may leak to the surface after processing to the vehicle interior material, since the siloxane-based compound has a high molecular weight and is coated to form a film, and this coated film may improve the slipping property.

In another exemplary embodiment, as of the amide-based compound, oleamide ($C_{18}H_{35}ON$) can be used. The amide-based compound may be used to impart slipping property to the surface of automotive vehicle interior material, and may leak to the surface right after processing to the vehicle interior material, since the amide-based compound has a low molecular weight and is coated to form a film, and this coated film acts as a lubricant necessary to decrease friction coefficient thereby improving slipping property.

Moreover, the slipping agent can be manufactured in a masterbatch form and added in order to optimally disperse the siloxane-based compound and the amide-based compound in the polypropylene resin composition. In this case, calcined silica can be used as a base resin.

Such a slipping agent may be used at about 1 to 3% by weight with respect to the total weight of the polypropylene resin composition. Slipping property may not be improved when the slipping agent is less than 1% by weight; and the overall physical properties may deteriorate and the compatibility between the polypropylene and other compositions may be inhibited when the slipping agent is more than 3% by weight. Hence, the slipping agent is preferably used in the above described range.

In addition, the resin composition of the present invention can further include one or more additives selected from the group consisting of a flame retardant, a lubricant, an antioxidant, a photostabilizer, a mold release agent, a pigment, an antistatic agent, an antimicrobial agent, a processing aid, a metal deactivator, a smoke inhibitor, a fluorine-based dripping inhibitor, and a coupling agent in addition to the above described main components in order to improve the performance of molded product and the processing characteristics.

The polypropylene resin composition according to the present invention may have high fluidity therefore can be easily injected into a molded product having a low thickness and can reduce a level of decrease in stiffness and impact property associated with the reduced thickness of product. Hence, the polypropylene resin composition of the present invention can be widely used for a door trim, a pillar trim, a tail gate, and the like of vehicle parts.

EXAMPLES

Hereinafter, the present invention will be described in further detail with reference to examples, but the following examples illustrate the invention and are not intended to limit the same.

Examples 1 to 4

Polypropylene resin compositions according to the exemplary composition ratio of the following Table 1 were prepared by blending for 5 minutes at room temperature, drying the blend, and then extruding using a biaxial extruder (manufacturer: SM, diameter: Ø45).

Thereafter, pellets of the polypropylene resin compositions were produced. The compositions in pellet shape were injection molded into specimens for measuring physical properties, EMBO specimens, and 350×100×3 mm sheet specimens of Examples 1 to 4 using an injection molding machine (manufacturer: LG Cable Ltd., mold clamping force: 140 ton) at 210° C. and their physical properties were measured.

Comparative Examples 1 to 7

Specimens for the measurement of physical properties, EMBO specimens, and 350×100×3 mm sheet specimens of Comparative examples 1 to 7 were prepared according to the composition ratio of the following Table 1 in the same manner as in Examples 1 to 4.

Physical properties with respect to the specimens and sheet specimens prepared according to Examples 1 to 4 and Comparative examples 1 to 7 were measured by the following methods, and the values for physical properties are shown in Table 5 below.

Test Examples

Measurement of Physical Properties

The result for physical properties shown in Table 5 below represents the average value obtained after excluding the maximum value and the minimum value from the results of physical properties with respect to 5 specimens, and the test methods are as follows.

(1) Measurement of specific gravity: A bend specimen of ASTM D790 standard was cut to prepare a specimen for the measurement of specific gravity, and then the measurement was performed based on a standard ASTM D792 method. As measuring equipment, DENSITY METER (manufacturer: MIRAGE, measuring range: 200 g/0.0001 g) was used.

(2) Measurement of tensile strength: The measurement was performed based on a standard ASTM D638 method. At this time, crosshead speed was 50 mm/min. As measuring equipment, UTM manufactured by Illinois Tool Works Inc. was used.

(3) Measurement of flexural modulus: The measurement was performed based on a standard ASTM D790 method. At this time, the crosshead speed was 10 mm/min. As measuring equipment, UTM manufactured by Illinois Tool Works Inc. was used.

(4) Measurement of impact strength: The measurement was performed based on a standard ASTM D256 method at room temperature (23° C.). As measuring equipment, an impact tester manufactured by Yasuda Seiki Seisakusho LTD was used.

(5) Measurement of scratch resistance: The test was performed using a scratch tester with sapphire tip, which is represented in FIG. 1, under the condition of Table 2 below, and then the state of surface was determined according to Table 3 below.

TABLE 1

Polypropylene resin composition (unit: % by weight)

| Division | | Examples | | | | Comparative examples | | | | | | | Remarks Existing material |
|---|---|---|---|---|---|---|---|---|---|---|---|---|---|
| Material | | 1 | 2 | 3 | 4 | 1 | 2 | 3 | 4 | 5 | 6 | 7 | |
| PP | CO-PP | — | — | — | — | 69 | — | — | — | — | — | — | 40 |
| | HCPP | 69 | 39 | 39 | 39 | — | — | 69 | 69 | 69 | 69 | 69 | 35 |
| | HOMO-PP | — | 30 | 30 | 30 | — | 69 | — | — | — | — | — | — |
| RUBBER | SEBS | 4 | 4 | 6 | 4 | 4 | 4 | — | 12 | 4 | 4 | 4 | — |
| | EOR | 8 | 8 | 6 | 8 | 8 | 8 | 12 | — | 8 | 8 | 8 | 10 |
| FILLER | TALC | 4 | 4 | 4 | 6 | 4 | 4 | 4 | 4 | 12 | — | 4 | 10 |
| | WHISKER | 8 | 8 | 8 | 6 | 8 | 8 | 8 | 8 | — | 12 | 8 | — |
| Vinyl acetal compatibilizer | | 2 | 2 | 2 | 2 | 2 | 2 | 2 | 2 | 2 | 2 | — | — |
| MA-g-PP | | 2 | 2 | 2 | 2 | 2 | 2 | 2 | 2 | 2 | 2 | 4 | 2 |
| Slipping agent 1) | | 2 | 2 | 2 | 2 | 2 | 2 | 2 | 2 | 2 | 2 | 2 | 2 |
| Other stabilizer 2) | | 1 | 1 | 1 | 1 | 1 | 1 | 1 | 1 | 1 | 1 | 1 | 1 |
| Sum total | | 100 | 100 | 100 | 100 | 100 | 100 | 100 | 100 | 100 | 100 | 100 | 100 |

1) Constitution of slipping agent: siloxane-based and amide-based
2) Other stabilizer: UV stabilizer, heat-resistant stabilizer, lubricant, and the like

TABLE 2

Measurement condition of scratch resistance

| Item | Condition |
|---|---|
| Load (kgf) | 0.5 (including the weight of scratch tester) |
| Stroke (mm) | 100 ± 5 |
| Scratching speed (mm/sec) | 100 |
| Scratched number | 1 time |

TABLE 3

Determination criteria for scratch resistance

| | | Determination criteria |
|---|---|---|
| Class | Width of scratch (μm) | Appearance |
| 5 | <20 | Almost no damage on the surface |
| 4 | 100 to 200 | Unrecognizable damage on the surface |
| 3 | 200 to 300 | Recognizable minute damage on the surface |
| 2 | 300 to 400 | Formation of flakes due to evident damage on the surface |
| 1 | >400 | Significant damage on the surface |

(6) Measurement of molding shrinkage rate: The measurement performed based on a standard ASTM D955 method. As a measuring instrument for specimen, Vernier calipers capable of measuring to 0.01 mm were used.

(7) Measurement of glossiness: The measurement was performed on an EMBO (HT74A) surface configured of a constant pattern based on a standard ASTM D523 (angle of incidence: 60°).

The above described physical properties of polypropylene resin composition should satisfy the prescribed standards in order to be used as a base material for vehicle interior material. Hence, a polypropylene resin composition, which does not satisfy even any one item among the above described items, was determined to be failed, since a product molded from such a polypropylene resin composition may cause a trouble when practically used, and such a polypropylene resin composition cannot be used as a base material for vehicle interior material.

TABLE 4

Prescribed standards required to be applied as a base material for vehicle interior material
Division

| Item | Required physical property | Unit |
|---|---|---|
| MI | 35 or more | g/10 min |
| Specific gravity | 0.97 ± 0.01 | — |
| Tensile strength | 25 or more | MPa |
| Elongation | 50 or more | % |
| Flexural strength | 34 or more | MPa |
| Flexural modulus | 3,000 or more | MPa |
| Impact strength | 400 or more | J/m |
| Heat deflection temperature | 130 or more | ° C. |
| Scratch resistance | 3 or more | Class |
| Gloss | 2.0 or less | 60° |
| Shrinkage rate  Flow direction | — | 1/1,000 mm |

TABLE 5

Measurement result for physical properties

| Division | | Examples | | | | Comparative examples | | | | | | | Remarks Existing material |
|---|---|---|---|---|---|---|---|---|---|---|---|---|---|
| Item | | 1 | 2 | 3 | 4 | 1 | 2 | 3 | 4 | 5 | 6 | 7 | |
| MI | | 35 | 37 | 38 | 37 | 35 | 36 | 35 | 37 | 35 | 36 | 35 | 24 |
| Specific gravity | | 0.97 | 0.97 | 0.97 | 0.98 | 0.97 | 0.97 | 0.97 | 0.97 | 0.98 | 0.96 | 0.97 | 0.97 |
| Tensile strength | | 27 | 29 | 29 | 26 | 22 | 30 | 24 | 27 | 24 | 30 | 26 | 23 |
| Elongation | | 60 | 50 | 55 | 60 | 70 | 40 | 70 | 80 | 60 | 30 | 60 | 70 |
| Flexural strength | | 38 | 39 | 40 | 37 | 35 | 37 | 35 | 39 | 35 | 39 | 35 | 36 |
| Flexural modulus | | 3,200 | 3,500 | 3,450 | 3,100 | 2,950 | 3,400 | 3,100 | 3,400 | 2,800 | 3,450 | 2,920 | 1,950 |
| Impact strength | | 430 | 410 | 420 | 430 | 440 | 200 | 350 | 450 | 400 | 410 | 390 | 140 |
| Heat deflection temperature | | 133 | 134 | 134 | 132 | 130 | 133 | 133 | 132 | 131 | 133 | 130 | 123 |
| Scratch resistance | | 3 | 3 | 3 | 3 | 2.5 | 3 | 3 | 3 | 2.5 | 3 | 3 | 3 |
| Gloss | | 1.6 | 1.8 | 1.8 | 1.7 | 1.5 | 2.2 | 1.6 | 2.2 | 1.4 | 2.1 | 1.7 | 1.8 |
| Shrinkage rate | Flow direction | 9.2 | 9.4 | 10.4 | 10.2 | 10.2 | 10.3 | 10.2 | 10.1 | 11.4 | 9.1 | 9.3 | 11.1 |
| | Vertical direction | 12.4 | 12.6 | 13.1 | 11.5 | 12.3 | 13.2 | 12.4 | 11.9 | 12 | 13.2 | 12.3 | 13.3 |
| | MD/TD deviation | 0.724 | 0.746 | 0.794 | 0.887 | 0.829 | 0.780 | 0.823 | 0.849 | 0.950 | 0.689 | 0.756 | 0.834 |
| | Average | 10.8 | 11 | 11.75 | 10.85 | 11.25 | 11.75 | 11.3 | 11 | 11.7 | 11.15 | 10.8 | 12.2 |
| Determination of pass or fail | | Pass | Pass | Pass | Pass | Fail | Fail | Fail | Fail | Fail | Fail | Fail | — |

From the test results of Table 5, the polypropylene resin compositions of Examples 1 to 4 satisfy all of the required properties such as specific gravity, stiffness, impact resistance, and glossiness.

On the other hand, the polypropylene resin composition of Comparative example 1, in which co-polypropylene was employed, was poor in stiffness such as tensile strength and flexural modulus, and did not satisfy scratch resistance. The polypropylene resin composition of Comparative example 2, in which only homo-polypropylene was employed, did not satisfy elongation, impact strength, and glossiness. The polypropylene resin composition of Comparative example 3, in which ethylene-octene elastomer was singly employed, did not satisfy tensile strength and impact strength. The polypropylene resin composition of Comparative example 4, in which only styrene-ethylene/butene-styrene elastomer was employed, did not satisfy glossiness. The polypropylene resin composition of Comparative example 5, in which only talc was employed, did not achieve weight reduction effect because of increase in specific gravity, and did not satisfy flexural modulus. The polypropylene resin composition of Comparative example 6, in which only whisker was employed, exhibited decrease in elongation and glossiness and disadvantage in dimension stability due to difference of MD/TD ratio in shrinkage rate. The polypropylene resin composition of Comparative example 7, in which only a modified polypropylene (ma-g-pp) compatibilizer was employed, exhibited disadvantage in securing flexural modulus and impact strength.

As described above, the polypropylene resin compositions of Examples 1 to 4 according to the present invention, in which each of the components are appropriately used, exhibit higher fluidity when compared with the polypropylene resin compositions of Comparative examples 1 to 7, which are out of the constitutional range of the present invention. Therefore, the polypropylene resin compositions of the present invention can be processed in a low thickness. The exemplary polypropylene resin compositions of Examples 1 to 4 according to the present invention exhibit also high stiffness and high impact property as well, therefore weight reduction of a vehicle can be achieved. Consequently, the polypropylene resin composition of the present invention can be effectively applied as base material for vehicle interior parts, such as door trim in particular.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene resin composition comprising:
   (A) about 60 to 80% by weight of a base resin selected from the group consisting of a high crystalline polypropylene, a propylene-ethylene copolymer, and a mixture thereof;
   (B) about 2 to 8% by weight of a styrene-ethylene/butene-styrene elastomer;
   (C) about 6 to 10% by weight of an ethylene-octene elastomer;
   (D) about 5 to 10% by weight of whisker;
   (E) about 2 to 8% by weight of talc;
   (F) about 1 to 3% by weight of a modified polypropylene grafted with maleic anhydride;
   (G) about 1 to 5% by weight of a vinyl-based acetal compatibilizer; and
   (H) about 1 to 3% by weight of a slipping agent containing a siloxane-based compound and an amide-based compound,
   wherein each said % by weight is based on the total weight of the polypropylene resin composition.

2. The polypropylene resin composition of claim 1, wherein the high crystalline polypropylene has an isotactic index (when measured by $^{13}$C-NMR) of 97% or more and a melt flow index (230° C., 2.16 kg) of about 10 to 60 g per 10 min.

3. The polypropylene resin composition of claim 1, wherein the propylene-ethylene copolymer has an ethylene monomer content of about 2 to 25% by weight based on propylene-ethylene copolymer weight.

4. The polypropylene resin composition of claim 1, wherein the whisker has an acicular shape, an average length of about 10 to 20 μm, and an average diameter of about 1 μm or less.

5. The polypropylene resin composition of claim 1, wherein the whisker is used together with about 0.2 to 1.0% by weight of magnesium stearate.

6. The polypropylene resin composition of claim 1, wherein the talc has a platy shape and an average particle size of about 5 to 15 μm.

7. The polypropylene resin composition of claim 1, wherein the modified polypropylene is grafted with a polar group of a polypropylene resin at about 1 to 2% by mole with respect to the total weight of the polypropylene resin composition.

8. The polypropylene resin composition of claim 1, wherein the vinyl-based acetal compatibilizer is one or more selected from the group consisting of a high molecular compound obtained by polymerization of a vinyl-based acetal monomer, a high molecular compound containing a vinyl-based acetal or a derivative thereof in a monomer, and a copolymer thereof.

9. The polypropylene resin composition of claim 1, wherein the slipping agent includes a siloxane-based compound and an amide-based compound at a mixing ratio between 1:9 and 9:1.

10. The polypropylene resin composition of claim 1, wherein the slipping agent is manufactured into a masterbatch form using calcined silica as a base resin.

11. The polypropylene resin composition of claim 9, wherein the siloxane-based compound is polydimethylsiloxane having a molecular weight of about 200,000 or more.

12. The polypropylene resin composition of claim 9, wherein the amide-based compound is oleamide ($C_{18}H_{35}ON$).

13. The polypropylene resin composition of claim 1, wherein the polypropylene resin composition further comprises one additive or two or more additives selected from the group consisting of a flame retardant for resin, a lubricant, an antioxidant, a photostabilizer, a mold release agent, a pigment, an antistatic agent, an antimicrobial agent, a processing aid, a metal deactivator, a smoke inhibitor, a fluorine-based dripping inhibitor, and a coupling agent.

14. A vehicle interior material manufactured using the polypropylene resin composition of claim 1.

15. A vehicle interior material manufactured by using the polypropylene resin composition of claim 13.

* * * * *